US012737587B2

(12) United States Patent
Miller

(10) Patent No.: US 12,737,587 B2
(45) Date of Patent: Sep. 15, 2026

(54) METAL DETECTION SYSTEM

(71) Applicant: Matthew Miller, Edgewater, CO (US)

(72) Inventor: Matthew Miller, Edgewater, CO (US)

(*) Notice: Subject to any disclaimer, the term of this patent is extended or adjusted under 35 U.S.C. 154(b) by 0 days.

(21) Appl. No.: 18/240,554

(22) Filed: Aug. 31, 2023

(65) Prior Publication Data

US 2024/0078408 A1 Mar. 7, 2024

Related U.S. Application Data

(60) Provisional application No. 63/402,951, filed on Sep. 1, 2022.

(51) Int. Cl.
*G06N 3/044* (2023.01)
*G01V 3/10* (2006.01)
*G01V 3/38* (2006.01)
*G06N 3/09* (2023.01)

(52) U.S. Cl.
CPC ............... *G06N 3/044* (2023.01); *G01V 3/10* (2013.01); *G01V 3/38* (2013.01); *G06N 3/09* (2023.01)

(58) Field of Classification Search
CPC G06N 3/044; G06N 3/09; G01V 3/10; G01V 3/38
See application file for complete search history.

(56) References Cited

U.S. PATENT DOCUMENTS 7,624,667 B2 12/2009 Kilkis
7,683,821 B1 3/2010 Clodfelter
8,173,970 B2 5/2012 Inbar
9,366,778 B1 * 6/2016 Johnson .................. G01V 3/15
10,806,334 B2 10/2020 Ganapati
10,867,338 B2 12/2020 Price
11,062,167 B2 7/2021 Hotson
2005/0128125 A1 6/2005 Li
2007/0296415 A1 * 12/2007 Stamatescu ............ G01V 3/104 324/228
2013/0057249 A1 * 3/2013 Winter ..................... G01V 3/38 324/67
2018/0136185 A1 5/2018 Agostinelli
(Continued)

FOREIGN PATENT DOCUMENTS

EP 3951716 A1 2/2022
WO WO-2017114109 A1 * 7/2017 ............. G01V 3/104
(Continued)

OTHER PUBLICATIONS

English Translation of WO 2017114109 A1. https://patents.google.com/patent/WO2017114109A1/en?oq=2017114109 (Year: 2017).*
(Continued)

*Primary Examiner* — Usmaan Saeed
*Assistant Examiner* — Beatriz Ramirez Bravo
(74) *Attorney, Agent, or Firm* — Lowenstein Sandler LLP

(57) ABSTRACT

A system includes a metal detector configured to provide an input signal responsive to being proximate an object; and a processing device configured to: receive the input signal from the metal detector; determine a plurality of features from the input signal; provide the plurality of features as input to a trained machine learning model (MLM); receive output from the trained MLM; and responsive to detection, based on the output, that the object comprises metal, cause output of a notification.

20 Claims, 11 Drawing Sheets

(56) References Cited

U.S. PATENT DOCUMENTS

| | | | | |
|---|---|---|---|---|
| 2018/0365556 | A1 | 12/2018 | Guttmann | |
| 2019/0035101 | A1 | 1/2019 | Kwant | |
| 2020/0151591 | A1 | 5/2020 | Li | |
| 2020/0160217 | A1 | 5/2020 | van Kollenburg | |
| 2020/0213434 | A1* | 7/2020 | Samkov | H04M 1/04 |
| 2020/0279140 | A1 | 9/2020 | Pai | |
| 2020/0302309 | A1 | 9/2020 | Golding | |
| 2020/0302335 | A1 | 9/2020 | Golding | |
| 2020/0364610 | A1 | 11/2020 | Sweeney | |
| 2020/0394566 | A1 | 12/2020 | Martin | |
| 2021/0011973 | A1 | 1/2021 | Motahari Nezhad | |
| 2021/0042656 | A1 | 2/2021 | Watson | |
| 2021/0234833 | A1 | 7/2021 | Schneider | |
| 2021/0258666 | A1 | 8/2021 | Mazed | |
| 2021/0272559 | A1 | 9/2021 | Medalion | |
| 2021/0406780 | A1 | 12/2021 | Lesner | |
| 2022/0074713 | A1 | 3/2022 | Malka | |
| 2022/0092317 | A1 | 3/2022 | Yang | |
| 2022/0092349 | A1 | 3/2022 | Yang | |
| 2022/0101047 | A1 | 3/2022 | Puri | |
| 2022/0114473 | A1 | 4/2022 | Awasthy | |
| 2022/0114888 | A1 | 4/2022 | Napanda | |
| 2022/0138568 | A1 | 5/2022 | Smolyanskiy | |
| 2022/0139384 | A1 | 5/2022 | Wu | |
| 2022/0147738 | A1 | 5/2022 | Huang | |
| 2022/0164808 | A1 | 5/2022 | Sharp | |
| 2022/0237378 | A1 | 7/2022 | Asri | |
| 2022/0284285 | A1 | 9/2022 | Huang | |
| 2022/0351074 | A1 | 11/2022 | Patterson | |
| 2023/0169807 | A1* | 6/2023 | Schuler | G07C 9/00571<br>340/5.2 |

FOREIGN PATENT DOCUMENTS

| | | | |
|---|---|---|---|
| WO | 2018199997 | A1 | 11/2018 |
| WO | 2020048728 | A1 | 3/2020 |
| WO | 2020126394 | A1 | 6/2020 |
| WO | 2020193708 | A1 | 10/2020 |
| WO | 2020218967 | A1 | 10/2020 |
| WO | 2021022079 | A1 | 2/2021 |
| WO | 2021259720 | A1 | 12/2021 |
| WO | 2022117643 | A1 | 6/2022 |

OTHER PUBLICATIONS

Wan et al., "Robust and Efficient Classification for Underground Metal Target Using Dimensionality Reduction and Machine Learning", Jan. 13, 2021, IEEE, pp. 7384-7401. (Year: 2021).*

Ha et al., "Neural Network for Metal Detection Based on Magnetic Impedance Sensor", Jun. 29, 2021, Sensors 2021, 21, 4456, pp. 1-13. (Year: 2021).*

Kim et al., "Planar Spiral Coil Design for a Pulsed Induction Metal Detector to Improve Sensitivities", (2014), (Year: 2014).*

Gutierrez, S. et al. "Advances on teh detection of Landmines and IEDs in Columbia using UWB GPR and Machine Learning Techniques"; 2021 15th European Conference on Antennas and Propagation, Mar. 22, 2021, pp. 1-4, IEEE.

Moalla et al., "Application of Convolutional and Recurrent Neural Networks for Buried Threat Detection using Ground Penetrating Radar Data"; IEEE Transactions on Geoscience and Remote Sensing, Oct. 2020; pp. 7022-7034; vol. 58, No. 10.

International Search Report and Written Opinion for International Application No. PCT/US2023/31853, 15 pages.

Kim, Bobae et al., "Planar Spiral Coil Design for a Pulsed Induction Metal Detector to Improve the Sensitivities", IEEE Antennas and Wireless Propagation Letters, vol. 13, 2014, 4 pages.

* cited by examiner

200

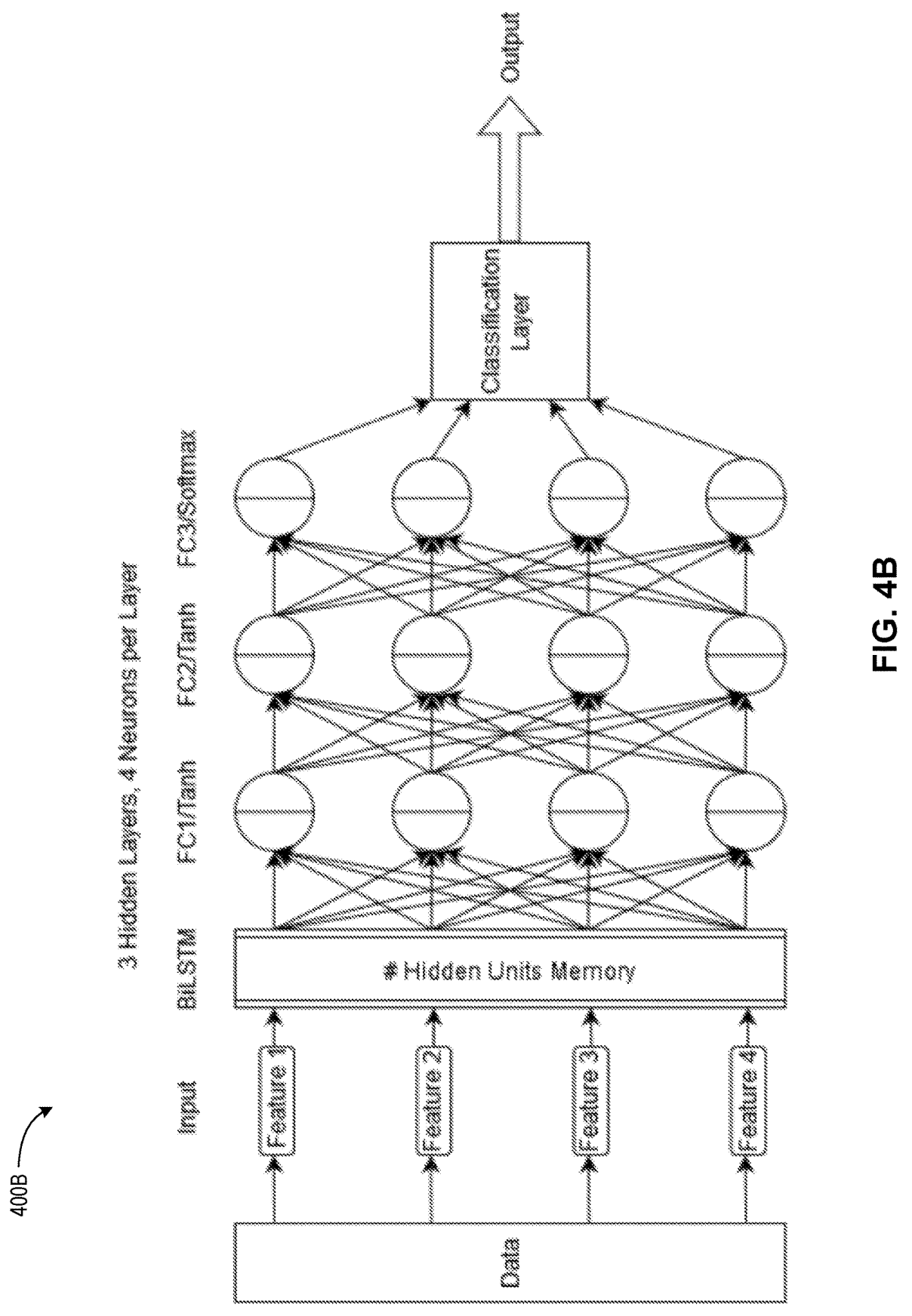

400B

3 Hidden Layers, 4 Neurons per Layer

Input

BiLSTM

FC1/Tanh

FC2/Tanh

FC3/Softmax

Data

Feature 1

Feature 2

Feature 3

Feature 4

Hidden Units Memory

Classification Layer

Output

FIG. 4B

Generate: (i) 1st training input (TI) having a plurality of features in 1st training signal;
(ii) 1st target output (TO) having 1st annotation data of a class for the plurality of features in 1st training signal
510

Train object classification MLM, with 1st TI and 1st TO, to classify the features by:
(i) identifying a plurality of reference features within the first training signal and make a prediction of the labels of the first training signal associated with the reference features ;
(ii) comparing the prediction with the annotation data of the class to make correction on one or more parameters of the MLM
520

FIG. 5

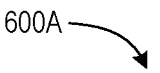
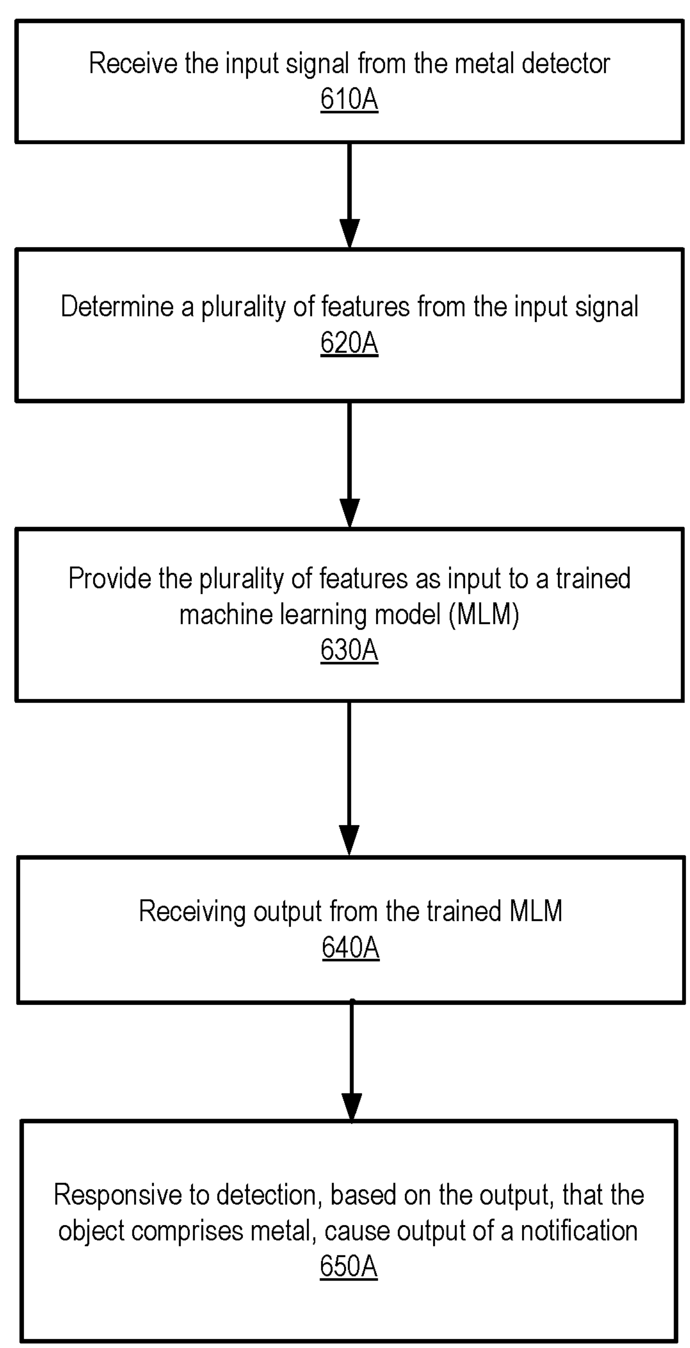
FIG. 6A

METAL DETECTION SYSTEM

RELATED APPLICATION

This application claims benefit of Provisional Application No. 63/402,951, filed Sep. 1, 2022, the entire content of which is incorporated by reference herein.

TECHNICAL FIELD

The disclosure relates generally to metal detection, and more particularly to a metal detection system that uses a neural network architecture to perform metal detection.

BACKGROUND

A metal detector is an instrument that detects the nearby presence of metal, such as finding metal objects on the surface, underground, and under water.

BRIEF DESCRIPTION OF DRAWINGS

The present disclosure is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

FIGS. 4A and 4B illustrate examples of machine learning models that can be used for metal detection, according to at least one embodiment;

FIG. 5 is a flow diagram of an example method of training machine learning models for use in metal detection, according to at least one embodiment;

FIGS. 6A and 6B are flow diagrams of example methods of using a trained machine learning model for metal detection, according to at least one embodiment;

DETAILED DESCRIPTION

Figure 1:
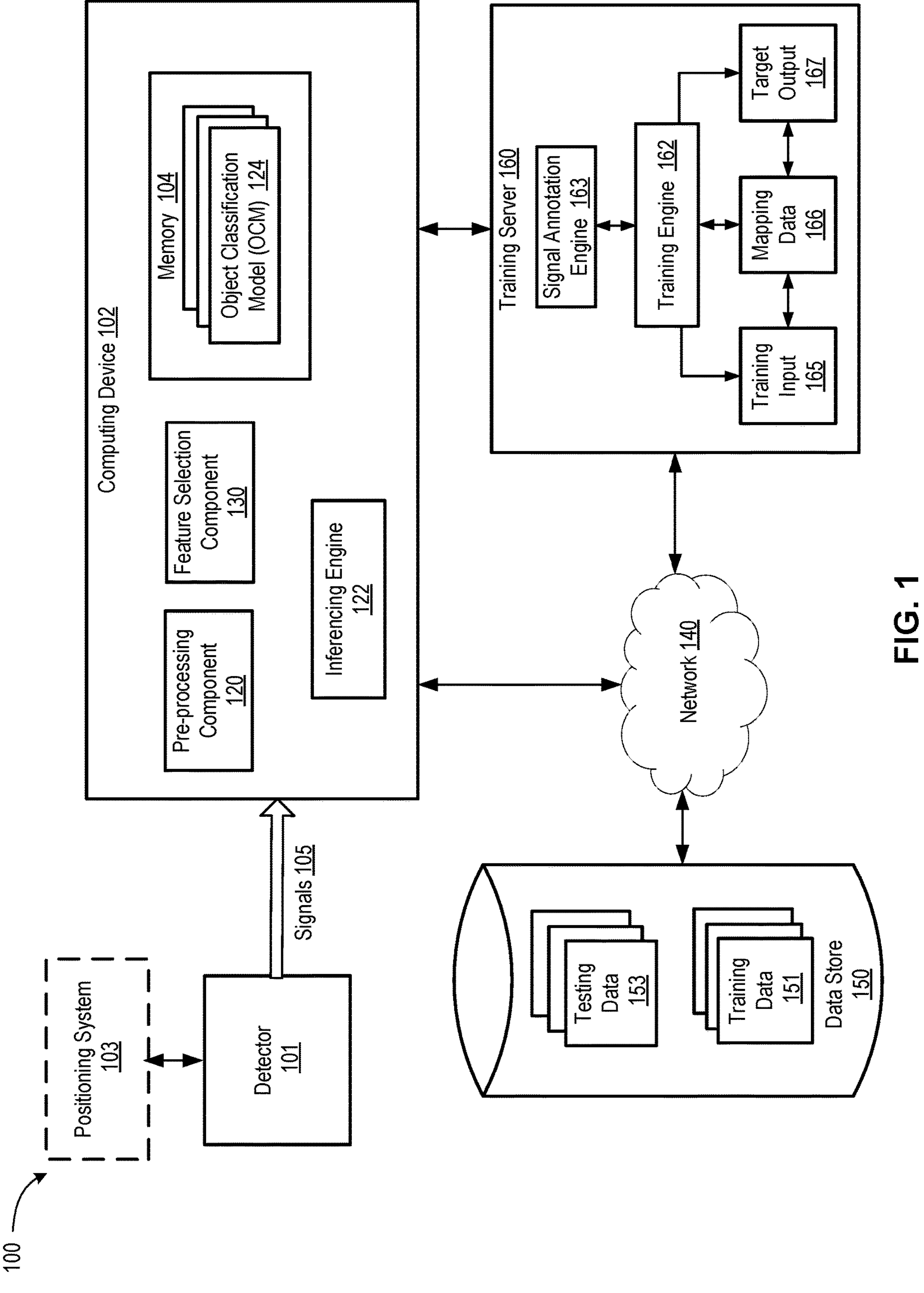
FIG. 1 is a block diagram of an example computer system that uses machine learning for metal detection, in accordance with at least some embodiments.

Embodiments described herein are related to a metal detection system (e.g., machine learning for clearing terrestrial hazards).

A metal detector is an instrument that detects the nearby presence of metal, such as finding metal objects on the surface, underground, and under water. Metal detectors can be used to locate artifacts, coins, valuable metals, discarded or lost valuable man-made objects, objects via beach combing, etc. Metal detectors can be used for security screening. Metal detectors can be used in industrial (e.g., pharmaceutical, food, beverage, textile, garment, plastics, chemicals, lumber, mining, packaging, etc.) activities to reduce safety issues, detect contamination, prevent theft, etc. Metal detectors can be used in construction and renovations (e.g., locate reinforcement bars inside walls). Metal detectors can be used to expose mines planted in fields during or after a war, detect explosives and cluster bombs, and search for weapons and explosives.

Demining (e.g., mine removal) is the method of clearing a field of terrestrial hazards. A terrestrial hazard may be detonated automatically by way of pressure when stepped on or driven over. Terrestrial hazards include landmines, improvised explosive devices (IEDs), command lines or trigger systems, and similar devices. These hazards either act directly to cause injuries and casualties or indirectly to deny access to terrain, logistics assets, and/or infrastructures. Larger hazards may be protected from clearing efforts by smaller hazards, such as antipersonnel (AP) mines or IEDs Clearance personnel are exposed to direct hazards in the course of their duties. Therefore, for example, there is a need to automatically detect terrestrial hazards while minimizing the risk of injury to clearance personnel.

Conventional metal detection systems (e.g., for demining, etc.) may have false positives, may have false negatives, and may require a user to be very close to the object that is to be detected, etc. These shortcomings of conventional metal detection systems can be a threat to safety of users, waste time and energy, reduce yield of searching activities, lead to more contamination, and so forth.

Aspects of the present disclosure are directed to a metal detection system. The present disclosure may implement a trained machine learning model to detect metal objects using signals generated by a metal detector. Specifically, when performing a detecting work over a surface, the metal detector, e.g., a pulse induction metal detector, can generate a voltage signal measured during a time period. A component of a computing device can receive the voltage signal, identify a set of features in the voltage signal, and apply the voltage signal with identified features to a trained machine learning model (MLM). The trained MLM is trained to classify the voltage signal with the identified features into a class. For example, the class can be one of the binary classes, representing non-metal or metal; or the class can be one of the multiple classes, representing non-metal, copper, iron, aluminum, and/or the like. In some implementations, the trained MLM may determine whether the features associated with the voltage signal are classified as a specific class by determining an output value associated with the specific class satisfies a threshold criterion (e.g., as the largest compared with output values associated with other classes). Responsive to determining that the features associated with the voltage signal are classified as a specific class, the trained MLM may determine that the voltage signal indicates a detection of a metal object or a specific type of metal object. The component of the computing device can receive, from the trained MLM, the determination regarding the detection and provide a notification (locally or remotely) regarding the detection.

The systems, devices, and methods disclosed herein have advantages over conventional solutions. Advantages of the present disclosure include, but are not limited to, an improved performance of the metal detection system by implementing a trained MLM. The trained MLM takes a voltage signal measured by a metal detector and output a prediction for a class that an object associated with the voltage signal belongs to. This can result in efficient metal detection. The present disclosure may improve safety of users, use less time and energy, increase yield of searching activities, reduce contamination, and so forth compared to conventional systems.

FIG. 1 illustrates an example environment including a metal detection system 100, according to embodiments of the present disclosure. As depicted in FIG. 1, a metal detection system 100 can include a detector 101 (e.g., metal detector), a computing device 102, a data store 150, and a training server 160 connected to a network 140. Network 140 may be a public network (e.g., the Internet), a private network (e.g., a local area network (LAN), or wide area network (WAN)), a wireless network, a personal area network (PAN), or a combination thereof. In some implementations, the metal detection system 100 may include a positioning system 103 coupled with the detector 101 to generate signals 105 that can provide information associated with the signal 105 to facilitate the metal detection. In some implementations, the metal detection system 100 may further include a routing component configured to cause the metal detection system 100 to be moved along a route.

Figure 2:
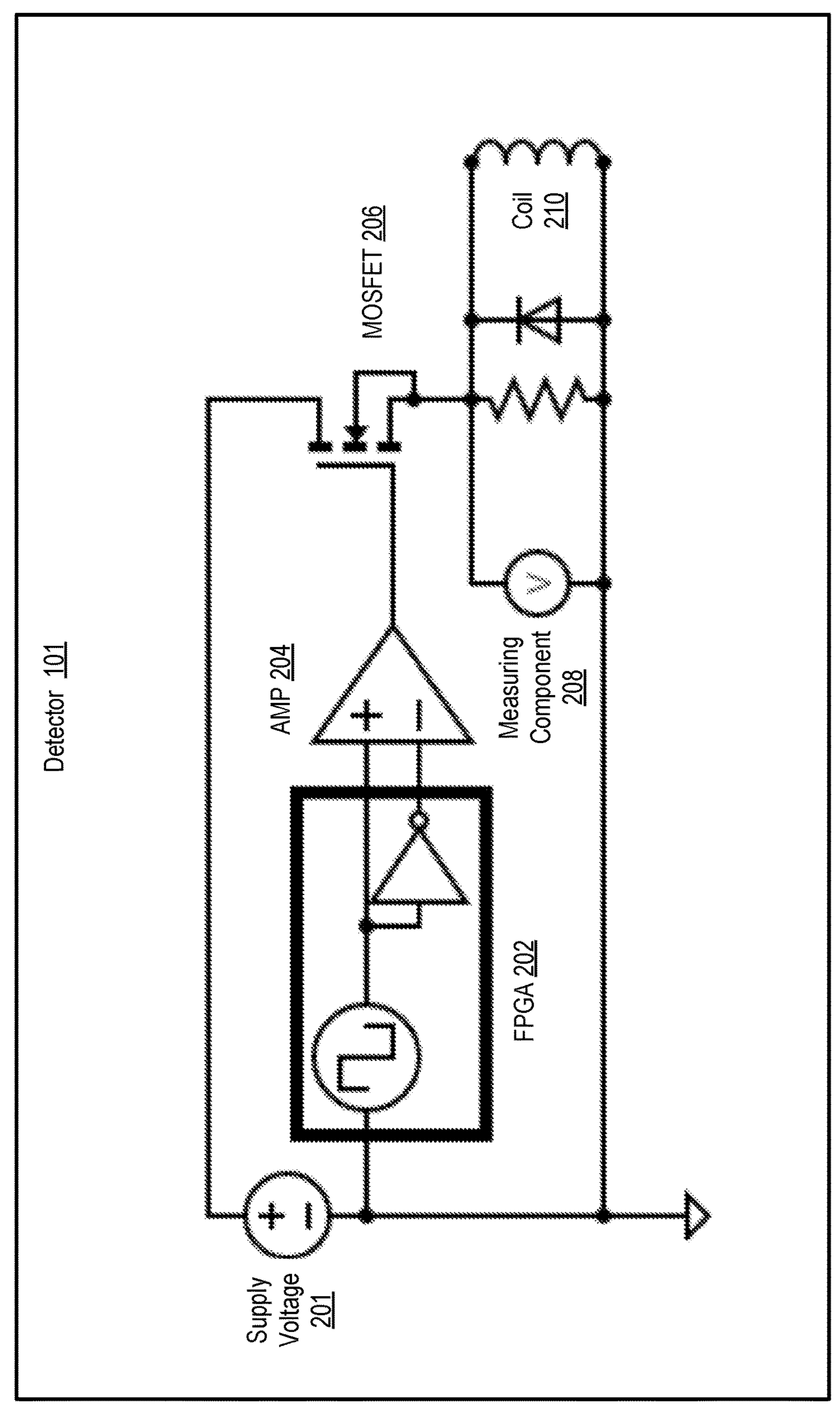
FIG. 2 is an example metal detector, according to at least one embodiment.

The detector 101 may be a metal detector capable of generating signals 105 (e.g., input signals). The details of the detector 101, according to certain embodiments, are illustrated with respect to FIG. 2. Referring to FIG. 2, in some embodiments, the detector 101 is a pulsed induction (PI) metal detector, which works by energizing a transmit (Tx) coil with current spikes and measuring the response on a reception (Rx) coil. The transmit (Tx) coil and reception (Rx) coil may be located close to each other and can be together referred to as a coil (e.g., coil 210). The current spikes in the PI metal detector can be produced by generating a square wave of current and switching the current in the coil from ON to OFF or OFF to ON. The square wave produces changing electric and magnetic (EM) fields which induce eddy currents in nearby conductive materials. These eddy currents decay, producing changing EM fields which induce voltages in the reception (Rx) coil. The induced voltages in the reception (Rx) coil are the signals generated from the PI metal detector.

For example, the coil 210 shown in FIG. 2 may be a circuit board comprising one copper trace. On one side of the circuit board, the copper trace follows a path of concentric squares with an outside diameter (e.g., 25.4 cm) and an inside diameter (e.g., 0.3 cm). The copper trace forms multiple (e.g., 50) equally-spaced windings. On the other side of the circuit board, the copper trace returns to the starting point. The returned trace is orthogonal to the input windings or aligned so the current flows in the same direction as the input windings.

In some implementations, the coil 210 may include a Printed Circuit Board (PCB) coil, which is a PCB with at least one layer comprising a single copper line, a trace, which forms square concentric loops, spiraling in. These loops form the coil. Another layer comprises a trace that either exits from the center in a short path or forms another coil can make the loops expanding from the center. The loops travel in the same direction on both layers, either clockwise or counterclockwise. This causes the fields generated by the current moving through the loops to be added up. In some implementations, the coil 210 may include a wound coil, in which some small wire is wound about a rigid frame. The frame may be square, circular, or of other shapes.

As shown in FIG. 2, a field-programmable gate array (FPGA) 202 (e.g., waveform generator, microcontroller) generates a square wave (pulse) of current, for example with a frequency (e.g., 1 kHz) with a duty cycle (e.g., 50%, that is, one half cycle is ON and the other half cycle is OFF). The output of the FPGA 202 is input to an amplifier (AMP) 204 to amplify the output and clean the noise that may exhibit in the following processing. The output of AMP 204 is input to a metal-oxide-semiconductor field-effect transistor (MOSFET) 206, which is used to switch on/off the current flow in the coil 210. For each coil 210, the supply voltage 201 (e.g., 18V) can be different. A voltage of the coil 210 can be measured at measuring component 208 and generated as signals 105. The coil 210 may be placed in parallel with an anti-ringing resistor (e.g., 390Ω) and a diode for the voltage measurement.

Figure 3A:
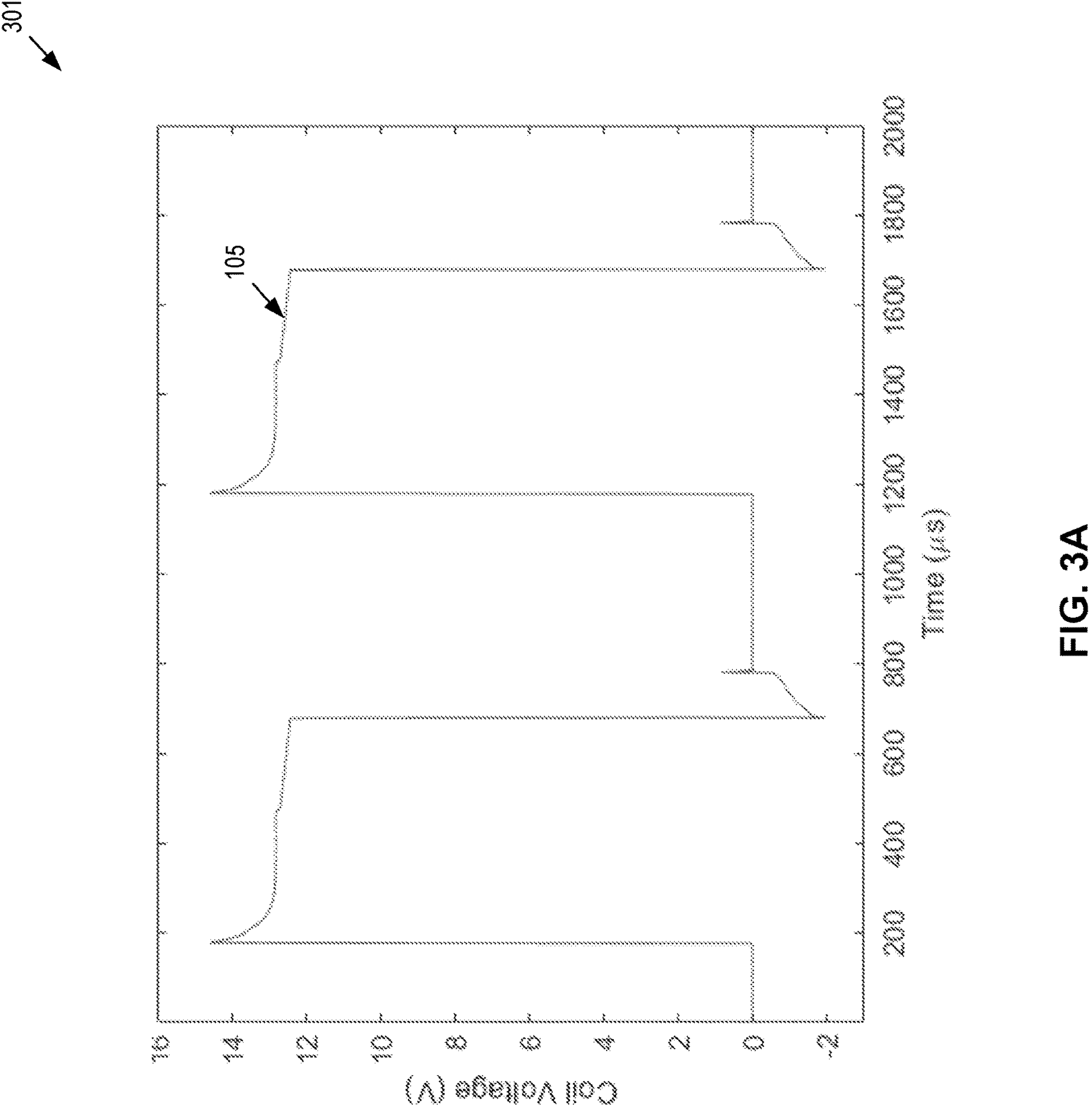
FIGS. 3A-3C illustrate example signal and features used by a machine learning model, according to at least one embodiment.

As shown in FIG. 3A, an example graph 301 of signals 105 is illustrated. The signals 105 may be received in an analog form and converted, by an analog to digital converter (ADC), to a digital form. The signals 105 may be recorded as a digital signal, for example, at a sampling rate (e.g., 1 MHz). The signals 105 may be recorded as a set of data points for a time period. For easy description and/or better training, the signals 105 may be divided into unit times (e.g., 10 seconds), where each unit-timed signal ("unit signal") is used as a run for determining whether the signal in the run indicates a detection of a metal object. Thus, a unit signal refers to the signal 105 generated during a unit time period, and each unit signal can be used to determine whether the unit signal indicates a metal detection.

Referring back to FIG. 1, the positioning system 103 can provide the position information associated with the detector 101. The position information provided by the positioning system 103 can be used together with data from the detector 101 to generate signals 105 with supplemental information (e.g., information that can be used to determine a set of features described below). In some implementations, the positioning system 103 can determine the position of the detector 101 by using one or more primary positioning systems and apply the position information from the primary positioning systems to one or more supplemental positioning systems to obtain supplemental information (e.g., features) that can be supplemental to the signal 105.

In some implementations, the primary positioning system may include global positioning system (GPS), other satellite positioning systems, or an inertial measurement unit (IMU). The supplemental positioning system may include a Kalman filter (e.g., linear quadratic estimation (LQE)) or a neural network to simulate a Kalman filter to extract supplemental information from the data output from the primary positioning system. The data output from the primary positioning systems may include GPS data, wheel-spin data, track-spin data, IMU data, distance ping data, visual odometry data, etc. For example, the data output from GPS may be provided as a ground truth, and some combination of wheel-spin, track-spin, IMU data, distance ping data, visual odometry data, etc., may be extracted as features. Because a large piece of object can be detectable across a large area, while a small piece of object can only be detectable when the detector is right above it in a small area, a strong signal that only exists in a small area has a high likelihood to be noise and a weak signal that exists over a large area is likely to be noise or soil interference. A strong signal refers to a signal having the change in a feature (e.g., a voltage measurement) exceeding a threshold value (e.g., a large value), and a weak signal refers to a signal having the change in a feature (e.g., a voltage measurement) below a threshold value (e.g., a small value). A ground truth can be used to increase the detection confidence of a strong signal across a large area or a weak signal in a small area.

In some implementations, classification consistency can be used to increase the detection confidence. For example, if a large area shows consistent detection of a particular metal, e.g., iron, the likelihood of an iron detection may correspond to a high detection confidence. If several different metal classifications have been shown in an area, the likelihood of an iron detection may correspond to a low detection confidence. The computing device 102 may receive such information in the form of a heat map. The heat map represents the detection confidence of the various target classification in an area. Using the position of the coil as determined by a GPS, Kalman filter, neural network interpolation, or other methods, the proximity of the coil to a detection area may be used as a feature.

In some implementations, signal repeatability can be used to increase the detection confidence. As the detector 101 moves over the same area, the signal that is not repeatable is likely to be noise. When the computing device 102 gets a detection with a confidence value that is above a minimum threshold detection confidence (e.g., 10% or other confidence value) but below a threshold for a confirmed detection (e.g., 50% or other confidence value), the detector 101 may be controlled to repeat the movement over the same area. In some implementations, if a detection is made again over the same area, even with low confidence value, the detection over the area can be considered as confirmed. In other words, the threshold for a confirmed detection may be lowered if the computing device 102 makes a detection repeatedly over the same area. In some implementations, the detector 101 is controlled to move over an area to generate a signal, and a heat map is generated for each signal and can be used as features.

The supplemental information can include movement information (e.g., through a linear input approach that assumes a straight line movement), a non-linear relationships (e.g., a function of slippage due to mud between the wheels or tracks and the ground) between feature and position, velocity, displacement, or similar numeric information. In some implementations, the supplemental information can include the distance and angle between the detector 101 and the datum point from which position is calculated by the positioning system 103, which can be known or detected via internal sensors. The supplemental information regarding position is used to provide more position information. For example, the GPS may report position information at a low frequency while the detector 101 may calculate or approximate the position of the coil 210 at a high frequency, and thus, the information such as wheel rotations, wheel slippage, and so forth may be used for the Kalman filter, neural network, or other methods to calculate position of the coil 210 at the time point when not reported by the GPS.

In some implementations, the supplemental information can include the displacement between a previous signal and a prospective signal and a heat map of the previous signal to obtain signal intensity by a center-of-signal approach. The center-of-signal approach may use methods similar to a method of calculating center of mass, where displacement times signal confidence is calculated and summed to obtain the ambient signal intensity in some region. For example, using square wave pulses as an example signal, the signal confidence of the square wave times the displacement between that square wave and the current square wave, summed over many such waves, would result in the signal intensity of the region. This signal intensity information may be used as a feature representing the center of the signal. Some numerical operations such as discrete differentiation may provide a feature encapsulating the intensity of the signal getting stronger or weaker.

The computing device 102 can be configured to receive signals 105 from the detector 101. The computing device 102 may be a desktop computer, a laptop computer, a smartphone, a tablet computer, a server, or any suitable computing device capable of performing the techniques described herein.

The computing device 102 can include a pre-processing component 120 capable of performing data pre-processing of signals 105. In some implementations, the pre-processing component 120 may perform normalization on the signal 105 to limit the value of the signal 105 within a range. The pre-processing component 120 may perform one or more of three forms of signal preprocessing, including voltage normalization, time normalization, and voltage biasing. Voltage normalization converts the voltage to either a fixed range, e.g., [−1 . . . 1], or fixed units, e.g., standard units. In standard units, the output is set such that the mean value is 0 and the standard deviation is 1. Time normalization converts the time to fixed times. For example, analog-to-digital converters do not operate at preferred sampling frequencies, and time normalization may adjust the voltage measurements to precise times not exactly present in the original measurements. Voltage biasing changes the voltage measurements in various methods. For example, a constant (e.g., 2 V) may be added to each voltage measurement. As another example, a function, such as doubling the voltage, may be applied to each voltage measurement. In some implementations, voltage biasing can be performed before other normalization.

The computing device 102 can include a feature selection component 130. The feature selection component 130 can identify features from data points in the signals 105. In some implementations, feature selection component 130 can identify the features by using all data points in a unit signal or down-sampling the data points in the unit signal. For example, a data point that corresponds to the lowest voltage in the unit signal can be identified as feature index 1 (n1), the data point after a time unit (e.g., 1 μs) from the lowest voltage data point can be labeled as feature index 2 (n2), the next data point after the same time unit can be labeled as feature index 3 (n3), and so on. In one example, the feature indexes n1-n500 can correspond to an OFF period of the pulse (e.g., 500 μs), and the feature indexes n501-n1000 can correspond to an ON period of the pulse (e.g., 500 μs). In this case, the unit time period is the sum of the OFF period of the pulse and the ON period of the pulse (e.g., 1000 μs), and the unit signal includes 1000 data points as identified features.

Figure 3B:
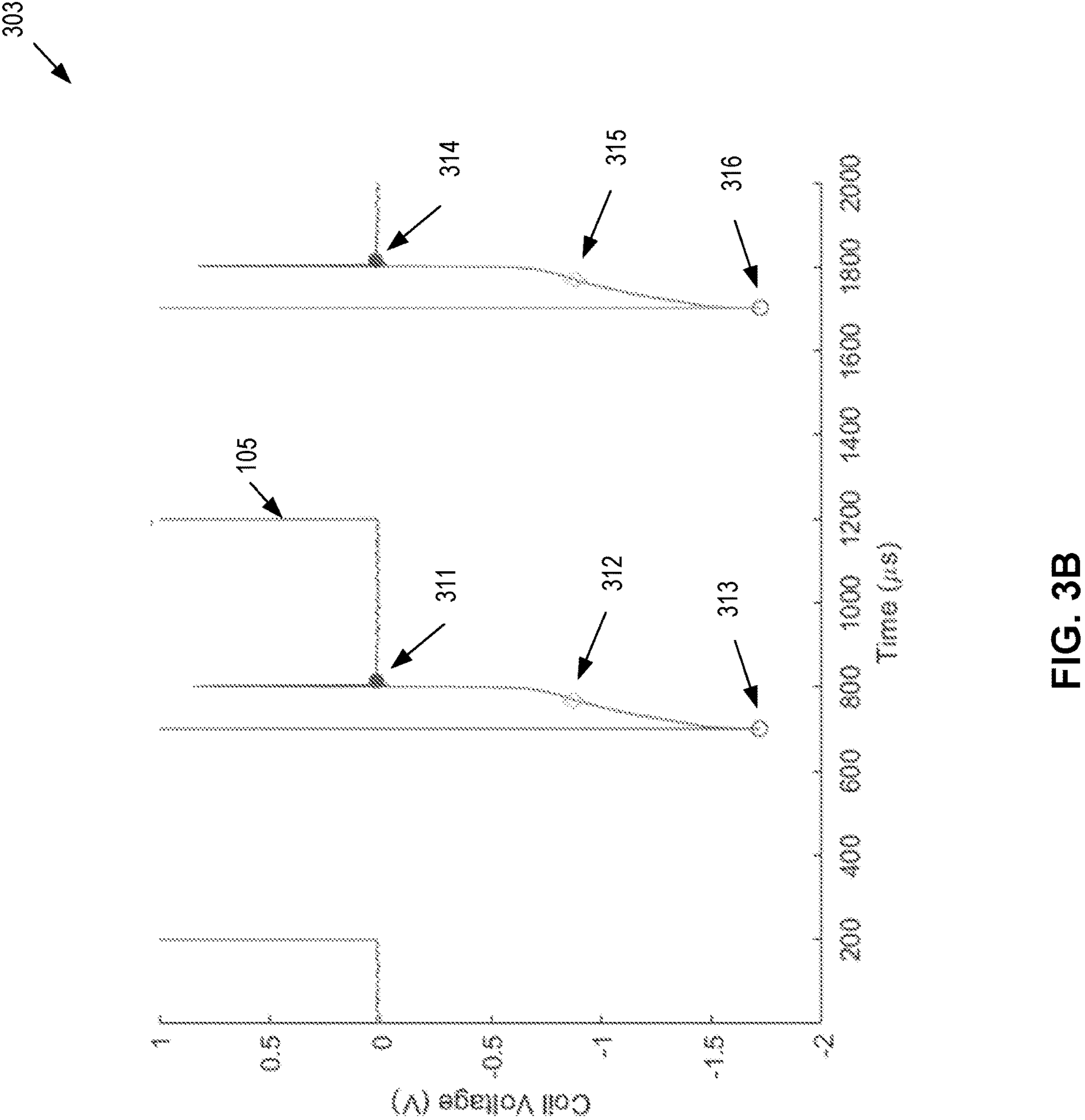

In some implementations, feature selection component 130 can identify the features by selecting the data points satisfying a criterion (e.g., lowest value in a time period, highest value in a time period, a change in value exceeding a threshold). For example, as shown in FIG. 3B, in the example graph 303, which is a zoom-in graph of part of graph 301, six data points 311-316 are identified. The data point 313 may correspond to feature index 1, representing the lowest value in a time period; the data point 312 may correspond to feature index 67, representing a change in value exceeding a threshold; the data point 311 may correspond to feature index 144, representing a change in value exceeding a threshold; the data point 316 may correspond to feature index 1001, representing the lowest value in a time period; the data point 315 may correspond to feature index 1067, representing a change in value exceeding a threshold; the data point 314 may correspond to feature index 1144, representing a change in value exceeding a threshold.

In some implementations, feature selection component 130 can identify the features by using a linear regression. The data points may be used to fit to a linear regression, for example, a slope of the least squared error line, which can be used as a feature. In some implementations, feature selection component 130 can identify the features by comparing the data points that are predefined as target (e.g., metal object presenting) with the data points that are predefined as background (e.g., no metal object presenting). In some implementations, feature selection component 130 can identify the features by using Fast Fourier transform (FFT) to the phase value. The FFT transforms the time-domain voltage information to frequency and phase information. This information may contain information about target interactions and can be used as a feature. For example, if part of the signal 105 has oscillations of consistent phase angles, this is unlikely to be caused by random noise. Random noise oscillations may have random phase angles. Likewise, consistent frequency oscillations are unlikely to be noise.

Figure 3C:
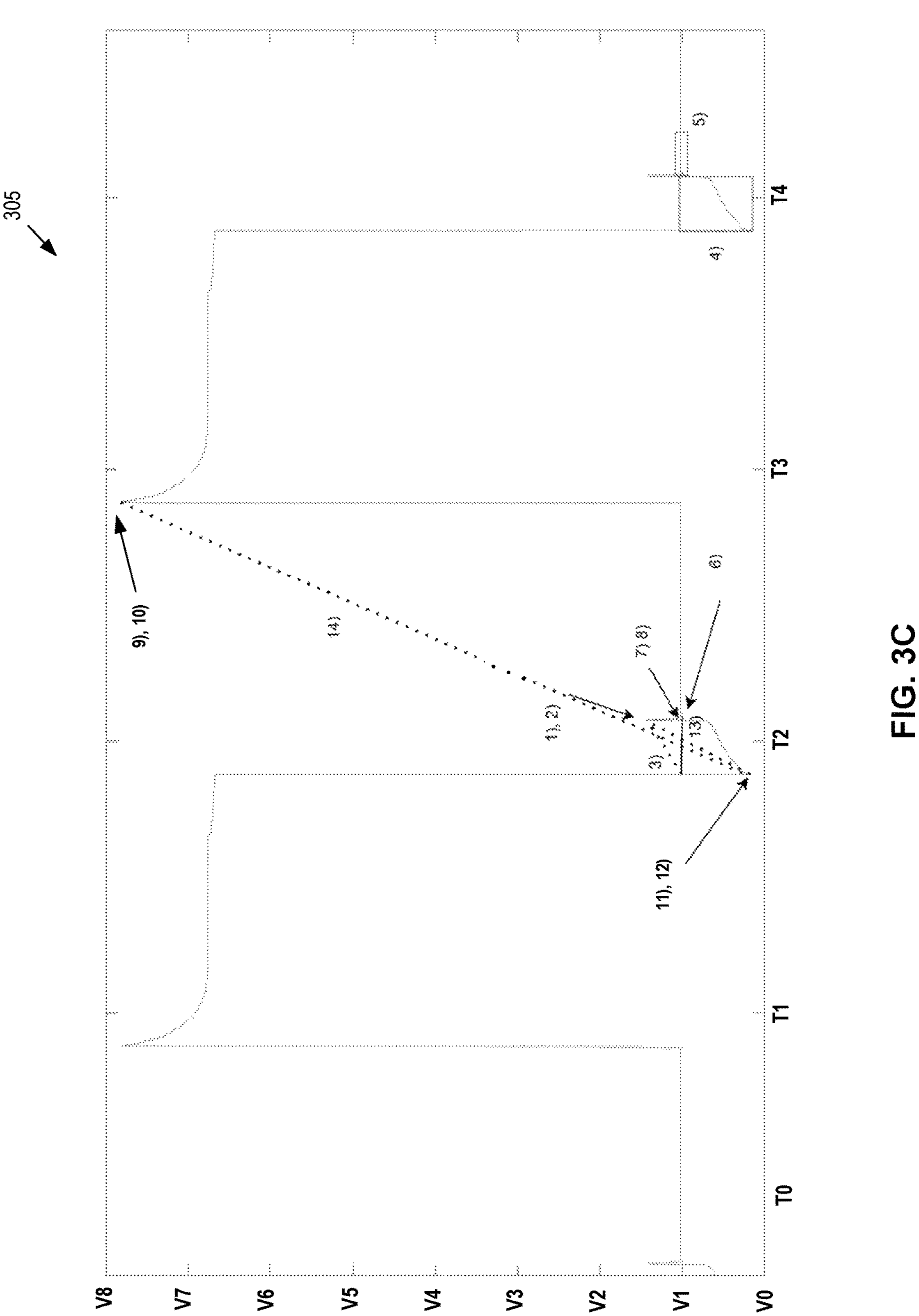

In some implementations, as shown in FIG. 3C, the graph 305 is shown with voltages (y-axis) from V0-V8 and time (x-axis) from T0-T4. The graph 305 includes the identified features: 1) The voltage (y-axis) of the highest voltage spike during the OFF phase of the signal (referred to as "OFF spike"); 2) The difference in time (x-axis) between the OFF spike and the starting point of OFF phase of the signal; 3) The slope of a projected line from the voltage (e.g., 0V) at the starting point of OFF phase to the crest of the OFF spike; 4) The summation of the voltages measured between the low point after the OFF transition and the OFF spike; 5) The summation of the voltages measured after the OFF spike to a time point; 6) The lowest voltage after the OFF spike; 7) The difference in time (x-axis) between the OFF spike and the lowest voltage after the OFF spike; 8) The difference in time (x-axis) between the starting point of OFF phase and the lowest voltage after the OFF spike; 9) The maximum voltage of the signal; 10) The difference in time (x-axis) between the maximum voltage and the starting point of OFF phase; 11) The minimum voltage of the signal; 12) The difference in time (x-axis) between the minimum voltage and the starting point of OFF phase; 13) The slope of a projected line from the minimum voltage at the time it occurs to the crest of the OFF spike; 14) The slope of a projected line from the minimum voltage at the time it occurs to the maximum voltage at the time it occurs within a unit signal. In some implementations, the OFF spike (e.g., moving right or left, getting bigger or smaller) can be an indicator of target presence. For example, when the detector detects iron or copper, the OFF spike moves to the right and gets smaller; when the detector detects aluminum, the OFF spike moves to the left; non-magnetic substances like water do not affect the OFF spike. Therefore, the position of the spike with respect to time and the magnitude of the voltage can be measurable characteristic of a detection.

In some implementations, the signal 105 can be generated as training data. The training data can include a plurality of unit signals, where each unit signal with the identified features are labelled with annotation data. The annotation data may include labels of classes (e.g., binary classes including metal or non-metal classes, or multiple classes including non-metal, copper, iron, or aluminum classes). In one example, the data points corresponding to the feature indexes n1-n1000 can present a unit signal and each feature index n1-n1000 can be labeled as "true," meaning that a metal object is detected in the unit signal, or "false," meaning that a metal object is not detected in the unit signal. In one example, the data points corresponding to the feature indexes n1-n1000 can present a unit signal and each feature index n1-n1000 can be labeled as "c1," meaning that no metal object is detected in the unit signal, or "c2," meaning that a specific type of metal object is detected in the unit signal. In one example, the three data points 311-313 that are associated with a unit signal can be labeled as "true," meaning that a metal object is detected in the unit signal or "false," meaning that a metal object is not detected in the unit signal. In one example, the three data points 314-316 that are associated with a unit signal can be labeled as "c1," meaning that no metal object is detected in the unit signal, or "c2," meaning that a specific type of metal object is detected in the unit signal.

The computing device 102 may store the signals 105 with identified features (e.g., a plurality of unit signals, where each unit signal with its identified features) in the memory 104 or the data store 150. Additionally, the data store 150 may store training data 151 for training one or more machine learning models for metal detection and may store testing data 153 for testing one or more machine learning models for metal detection. The data store 150 can be accessed by computing device 102 directly or (as shown) via network 140.

The data store 150 may be a persistent storage capable of storing signals as well as metadata for the stored signals. The data store 150 may be hosted by one or more storage devices, such as main memory, magnetic or optical storage based disks, tapes or hard drives, network attached storage (NAS), storage area networks (SAN), and so forth. Although depicted as separate from computing device 102, in at least one embodiment, the data store 150 may be a part of computing device 102. In at least some embodiments, the data store 150 may be a network-attached file server, while in other embodiments, the data store 150 may be some other type of persistent storage such as an object-oriented database, a relational database, and so forth, that may be hosted by a server machine or one or more different machines coupled to the computing device 102 via network 140.

Computing device 102 may include a memory 104 communicatively coupled with one or more processing devices, such as one or more graphics processing units (GPU) and one or more central processing units (CPU). Memory 104 can store one or more machine learning models such as one or more object classification models (OCMs) 124 (e.g., MLMs).

The OCMs 124 may be trained by a training server 160. In at least one embodiment, training server 160 may be a part of computing device 102. In other embodiments, training server 160 may be communicatively coupled to computing device 102 directly or via network 140. Training server 160 may be (and/or include) a rackmount server, a router computer, a personal computer, a laptop computer, a tablet computer, a desktop computer, a media center, or any combination thereof. Training server 160 may include a training engine 162. In at least one embodiment, training engine 162 may generate one or more machine learning models (e.g., OCM 124). The generated machine learning models may be trained by training engine 162 using training data (e.g., training data 151) that may include training input(s) 165 and corresponding target output(s) 167. In at least one embodiment, different machine learning models can be trained separately for different types of metals (e.g., copper, iron, and aluminum).

For training of OCM 124, training input(s) 165 may include one or more training signals and various metadata for the training signals. Training signals may be voltage measured at the coil (e.g., coil 210), and the like. A signal annotation engine 163 may annotate the features in the unit signals with classification of the target objects (e.g., non-metal, metal (copper, iron, aluminum, etc.)) and generate target output(s) 167, which may be training input(s) 165 with ROI annotations. Additionally, training engine 162 may generate mapping data 166 (e.g., metadata) that associates training input(s) 165 with correct target output(s) 167. During training of OCM 124, training engine 162 may identify patterns in training input(s) 165 based on desired target output(s) 167 and train OCM 124 to perform the classification of target objects using the identified patterns. Predictive utility of the identified patterns may be subsequently verified using additional training input/target output associations and then used, during inference stage, by OCM 124, in future processing of new signals.

In some implementations, a training framework can train untrained neural network using training data. In at least one embodiment, training framework may be MATLAB, PyTorch, TensorFlow, Boost, Caffe, Microsoft Cognitive Toolkit/CNTK, MXNet, Chainer, Keras, Deeplearning4j, or other training framework. In at least one embodiment, training framework trains an untrained neural network and enables it to be trained using processing resources described herein to generate a trained neural network (e.g., OCM 124). In at least one embodiment, weights may be chosen randomly or by pre-training using a deep belief network. In at least one embodiment, untrained neural network is trained using supervised learning, where training data includes an input paired with a desired output for an input, or where training data includes input having a known output and an output of neural network is manually graded. In at least one embodiment, untrained neural network is trained in a supervised manner and processes inputs from training dataset and compares resulting outputs against a set of expected or desired outputs. In at least one embodiment, errors are then propagated back through untrained neural network. In at least one embodiment, training framework adjusts weights that control untrained neural network. In at least one embodiment, training framework includes tools to monitor how well untrained neural network is converging towards a model (e.g., OCM 124), suitable to generating correct answers based on input data. In at least one embodiment, training framework trains untrained neural network repeatedly while adjust weights to refine an output of untrained neural network using a loss function and adjustment algorithm, such as stochastic gradient descent. In at least one embodiment, training framework trains untrained neural network until untrained neural network achieves a desired accuracy. In at least one embodiment, trained neural network can then be deployed to implement any number of machine learning operations.

In some implementations, a model (e.g., OCM 124) may use logistic Regression and Support Vector Machines algorithms Random Forest for binary classification, and use Naive Bayes, K-Nearest Neighbors, Gradient Boosting, SVM, or Logistic Regression for multi-class classification.

In at least one embodiment, each or some of OCMs 124 may be implemented as deep learning neural networks having multiple levels of linear or non-linear operations. For example, each or some of OCMs 124 may be recurrent neural networks (RNN). In at least one embodiment, each or some of OCMs 124 may include multiple neurons, and each neuron may receive its input from other neurons or from an external source and may produce an output by applying an activation function to the sum of (trainable) weighted inputs and a bias value. In at least one embodiment, each or some of OCMs 124 may include multiple neurons arranged in layers, including an input layer, one or more hidden layers, and an output layer. Neurons from adjacent layers may be connected by weighted edges. Initially, edge weights may be assigned some starting (e.g., random) values. For every training input 165, training engine 162 may cause each or some of OCMs 124 to generate output(s). Training engine 162 may then compare observed output(s) with the desired target output(s) 167. The resulting error or mismatch, e.g., the difference between the desired target output(s) 167 and the actual output(s) of the neural networks, may be back-propagated through the respective neural networks, and the weights in the neural networks may be adjusted to make the actual outputs closer to the target outputs. This adjustment may be repeated until the output error for a given training input 165 satisfies a predetermined condition (e.g., falls below a predetermined value). Subsequently, a different training input 165 may be selected, a new output generated, and a new series of adjustments implemented, until the respective neural networks are trained to an acceptable degree of accuracy. The details of training the OCM 124 for metal detection is illustrated with respect to FIG. 5.

Computing device 102 may host an inferencing engine 122 to run one or more OCMs 124 that has been trained. Inferencing engine 122 may be executed by GPU and/or CPU. Inferencing engine 122 can use signals 105 as input and apply the input to the OCM 124 that has been trained to determine whether the input indicates a detection of a metal object based on the features identified in the input signal 105, such as non-metal, metal (copper, iron, aluminum, etc.), and the like. The details of using the OCM 124 for metal detection is illustrated with respect to FIGS. 6A and 6B.

Figure 4A:
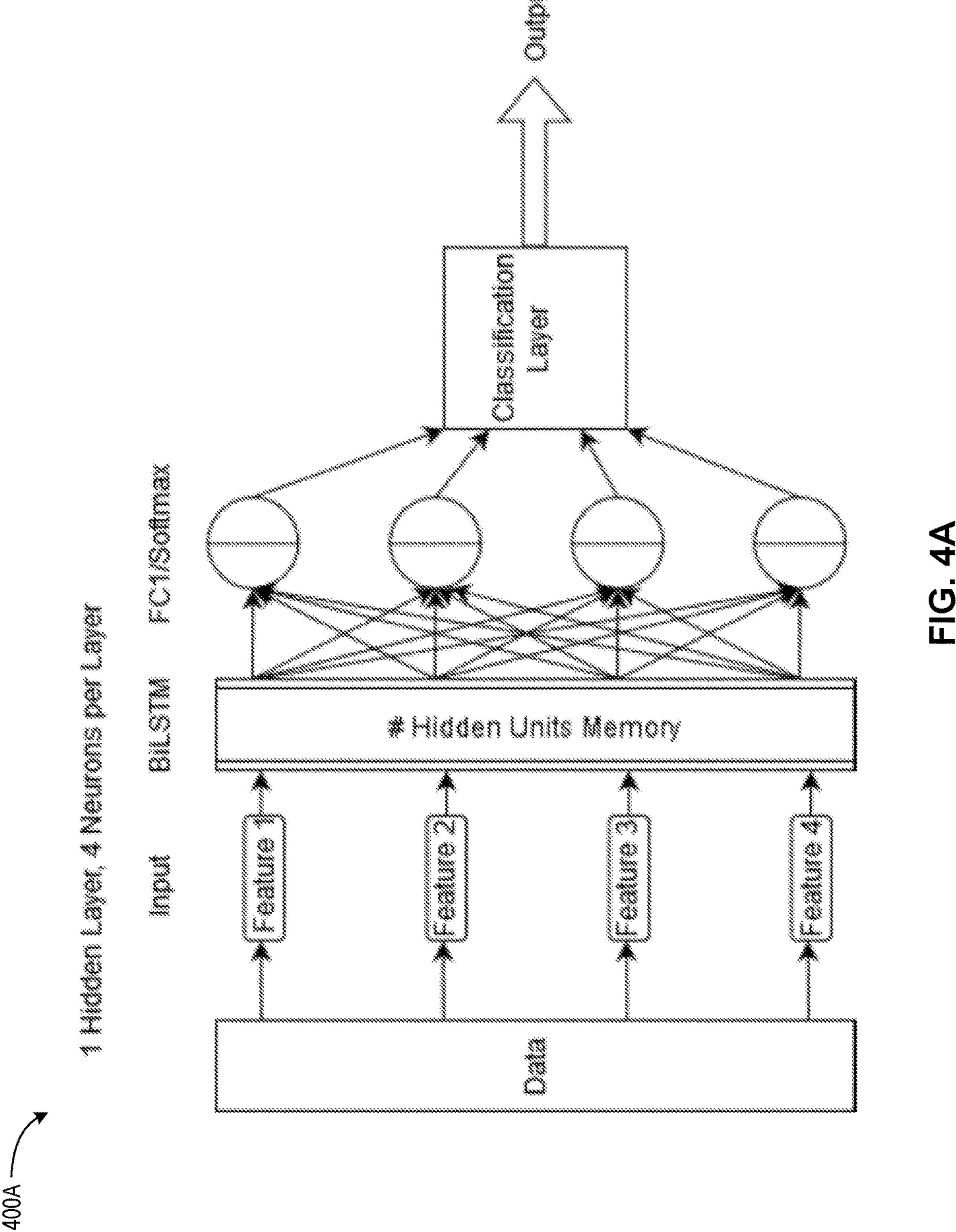

FIGS. 4A and 4B illustrate examples of recurrent neural network (RNN) geometries for facilitating metal detection using signals generated from a metal detector. Referring to FIG. 4A, the RNN 400A may include an input layer, a Bidirectional Long-Short Term Memory (BiLSTM) layer, a Fully Connected (FC) layer, a softmax activation layer, and a classification layer. The input layer receives features (e.g., four features shown in FIG. 4A), and the features may include arbitrary number (e.g., 10, or 1000) of features. The BiLSTM layer acts as a memory and retains the last number of hidden units observations. The BiLSTM layer allows the neural network to calculate changes of a feature over time. This may be used to calculate classifications a few milliseconds after the pulse, a few seconds after the pulse, at the end of a sweep of the coil, or any time after that. The bi-directional part of the BiLSTM layer means that the layer retains forward and backward observations in time. The number of hidden units in the BiLSTM layer varies.

The standard FC layer is shown as the left side of the circle, representing the weights and biases. Each circle represents one node. Every input to the node, shown as an arrow pointing into a given circle, is multiplied by a weight. The weight is a constant number that may be positive or negative. The sum of all weighted inputs for each node is modified by adding a bias. The bias is another constant number that may be positive or negative. This sum of weighted inputs and bias is the output of each node. The output of each node is passed to an activation layer. The activation layer may be a softmax layer as shown in FIG. 4A, and the softmax activation layer is shown as the right side of the circle. The Fully Connected (FC) and the softmax layer can represent one hidden layer, thus can be referred to as FC/Softmax layer. The number of neurons in the FC layer can equal the number of target classes, e.g., two classes for non-metal and metal; four classes for no-target, copper, iron, and aluminum. Neural networks to detect more than four classes of targets can have more nodes in the final FC layer, and can be generalized to any number of target classes by expanding the number of nodes in the final FC layer. In other layers, the number of neurons may be arbitrary. The softmax layer outputs a confidence value for each associated class, e.g., target or no-target, or iron, copper, aluminum, or no-target.

The classification layer takes the confidence values from each of the softmax layers. The classification layer may pick the highest confidence value among the confidence values and report that class as the output, and report all confidence values. The classification layer converts each confidence value from the softmax layers to percentages and ensures the percentages sum to 100%. The highest confidence value classification is outputted as the decision of the detection. Other classifications that does not have the highest confidence value may also be outputted as data, to be used as features, elements of the heat map, sent to the user, etc.

Referring to FIG. 4B, the RNN 400B may include an input layer, a Bidirectional Long-Short Term Memory (BiLSTM) layer, a Fully Connected/tanh activation layer (FC1/Tanh), a Fully Connected/tanh activation layer (FC2/Tanh), a Fully Connected/softmax layer (FC3/Softmax), and a classification layer. FIG. 4B shows multiple activation layers, and each of the multiple activation layers is associated with a FC layer. Specifically, FIG. 4B shows two FC layers, the outputs of which are passed to tanh activation layers, and a third FC layer, the output of which is passed to a softmax layer. The activation layers of FC 1 and FC 2 are tanh layers, and for FC 3 the activation layer is a softmax layer. The number of neurons in the FC3/Softmax layer can equal the number of target classes, e.g., two classes for non-metal and metal; four classes for no-target, copper, iron, and aluminum.

Figure 6B:
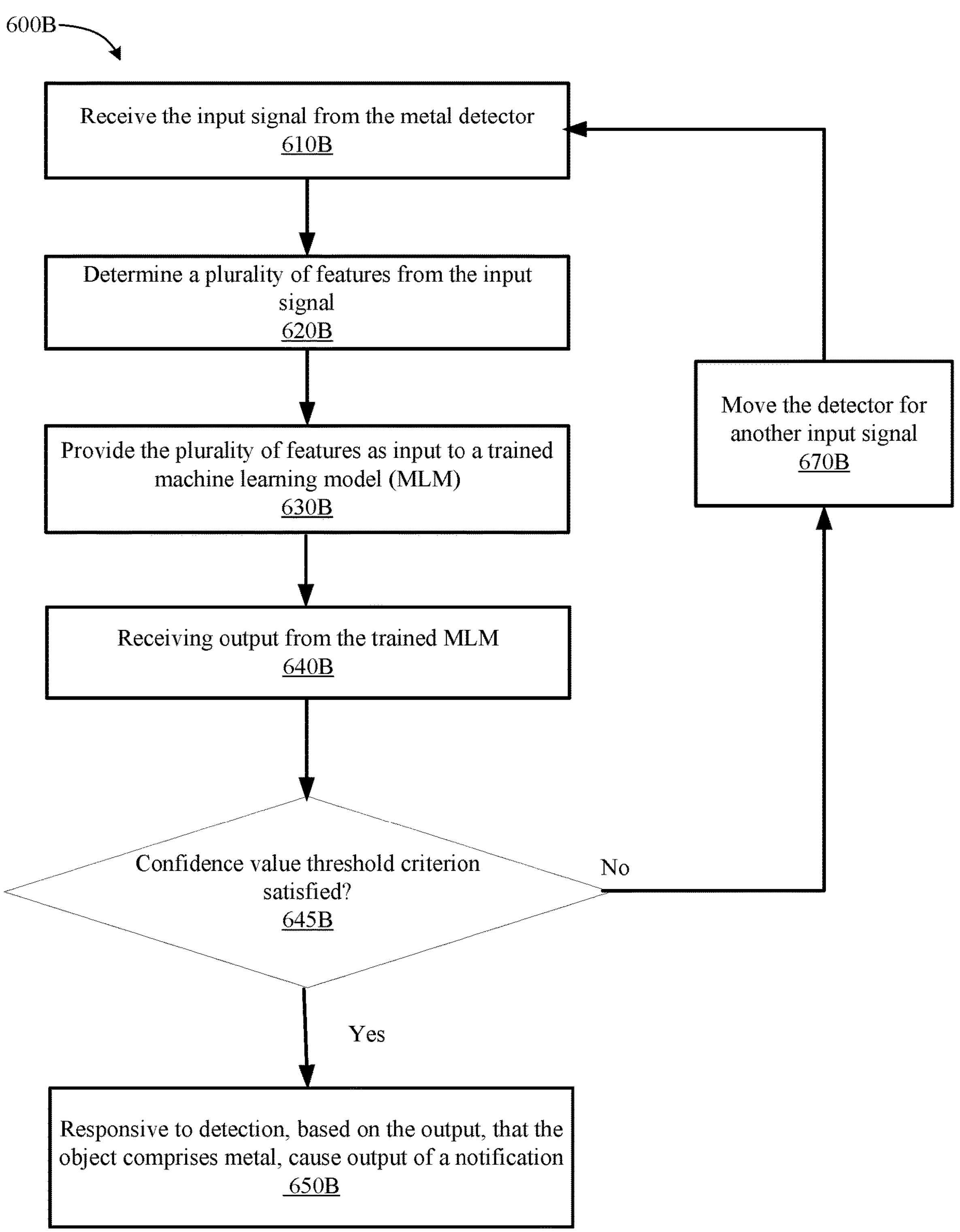

FIG. 5 and FIGS. 6A and 6B are flow diagrams of example methods 500, 600A, and 600B respectively that facilitate object detection, according to some embodiments of the present disclosure. In at least one embodiment, methods 500, 600A, and 600B may be performed by processing units of training server 160 or computing device 102. Methods 500, 600A, and 600B may be performed by one or more processing units (e.g., CPUs and/or GPUs), which may include (or communicate with) one or more memory devices. In at least one embodiment, methods 500, 600A, and 600B may be performed by multiple processing threads (e.g., CPU threads and/or GPU threads), each thread executing one or more individual functions, routines, subroutines, or operations of the method. In at least one embodiment, processing threads implementing method 500 (and, similarly, methods 600A and 600B) may be synchronized (e.g., using semaphores, critical sections, and/or other thread synchronization mechanisms). Alternatively, processing threads implementing method 500 (and, similarly, methods 600A and 600B) may be executed asynchronously with respect to each other. Various operations of methods 500, 600A, and 600B may be performed in a different order compared with the order shown in FIGS. 5, 6A, and 6B. Some operations of the methods may be performed concurrently with other operations. In at least one embodiment, one or more operations shown in FIGS. 5, 6A, and 6B may not always be performed.

FIG. 5. is a flow diagram of an example method 500 of training machine learning models for use in efficient metal detection, according to at least one embodiment. Method 500 may be performed to train MLMs for use in metal detection. Processing units performing method 500 may generate, at block 510, a first training data that may include a first training input and a first target output. The first training input may include a plurality of features in the first training signal. The first target output may include first annotation data that classify the plurality of features in the first training signal (e.g., a binary class—non-metal or metal, a multi-class—non-metal, copper, iron, or aluminum). The first training signal may be a voltage measured by the metal detector during a unit period time, or other voltage measurement suitable for metal detection. The first training input may be one of a first set of training inputs. Similarly, the first target output may be one of a first set of target outputs.

At block 520, method 500 may continue with the processing units providing the first training data to train a classification MLM. The classification MLM may identify a plurality of reference features within the first training signal and make a prediction of the labels of the first training signal associated with the reference features and compare the prediction with the annotation data to make correction on one or more parameters of the MLM.

In at least one embodiment, during training, the MLM may select a plurality of reference features within the training signal. The selection may be made using a human input. In at least one embodiment, the selection may be made without any human input. The selected reference features may be features that are likely to be present in the signal of a similar type, for example, the change of value exceeding a threshold value, the lowest voltage within a time period, the ON/OFF transition of each square wave, the highest voltage within a time period, the time period between the lowest or highest voltage and the ON/OFF transition, etc. Features may be selected by operator knowledge, rigorous testing, statistical analysis, or algorithmic methods. Algorithmic methods for selecting the features include sequential forward selection, sequential floating forward selection, sequential backward selection, and sequential floating backward selection.

In at least one embodiment, processing units performing method 500 may use the selected reference features to make a prediction of classes of the unit signal associated with the reference features. In some implementations, the processing units may predict the class of each reference feature. The prediction may be in a form of probability, where the class, among all classes, which has the largest probability is the class the reference feature is predicted to belong to. In some implementations, processing units performing method 500 may make a prediction of whether the signal indicates a detection of a metal object using the selected reference features. For example, processing units performing method 500 may determine that the number of the selected reference features that have been predicted as belong to a class of a metal satisfies a threshold criterion (e.g., exceeding a threshold number or percentage), and then determine that the signal indicates a detection of a metal object (or a specific type of metal).

In at least one embodiment, processing units performing method 500 may, by comparing prediction with the annotation data, determine a mismatch between the prediction and annotation data. For example, predicted classes may not be completely accurate, compared with the information specified in the annotation metadata for the training signal, e.g., may have an error (mismatch) in excess of a maximum tolerance error. Responsive to determining that the maximum tolerance error is exceeded, processing units performing method 500 may update, based on the identified mismatch, the one or more parameters of the MLM. In at least one embodiment, the prediction may be updated in arbitrary (multiple) direction(s) and the updated prediction may be back-propagated through the MLM for the same training signal. Based on the results of (one or more of such) back-propagation(s), a derivative (or a gradient) of the loss function may be computed and a direction of the most favorable update may be selected. This process may be repeated until the mismatch with the prediction is minimized.

In at least one embodiment, the MLM may also update the selection of the plurality of reference features. For example, instead of (or in addition to) updating the parameters of the MLM, the MLM may use a set of new reference features. This process may also be repeated until the mismatch with the prediction is minimized. In at least one embodiment, updates of the parameters of the MLM and updates of the reference features may be performed separately (e.g., sequentially). In at least one embodiment, updates of the parameters of the MLM and updates of the reference features may be performed concurrently (e.g., in parallel).

In some implementations, the processing units performing method 500 may generate second (third, etc.) training data comprising a second (third, etc.) training input and a second (third, etc.) target output. The second (third, etc.) training input may include a second (third, etc.) training signal representing a first (second, etc.) plurality of features. The second (third, etc.) training data may further include the second (third, etc.) target output comprising second (third, etc.) annotation data that identifies the first (second, etc.) plurality of features. The second (third, etc.) training input may be one of a second (third, etc.) set of training inputs. Similarly, the second (third, etc.) target output may be one of a second (third, etc.) set of target outputs.

In some implementations, the processing units performing method 500 may provide the second (third, etc.) training data to train the object identification MLM. After training that is based on the second (third, etc.) set of training inputs and the second (third, etc.) set of target outputs, the object identification MLM may be able to classify the objects associated with the features in the signal.

FIG. 6A is a flow diagram of an example method 600A of using a trained machine learning model for efficient metal detection, according to at least one embodiment. Processing units performing method 600A may receive, at block 610A, an input signal from a metal detector (e.g., detector 101). The input signal may be a new signal not previously used for training of the machine learning models. The input signal may be a voltage measured over a time period.

At block 620A, method 600A may continue with the processing units determining a plurality of features from the input signal. In at least one embodiment, a first feature of the plurality of features may include a representation of a change in value of the signal (e.g., voltage) exceeding a threshold or a highest or lowest value during a time period. In at least one embodiment, determining the plurality of features within the input signal is performed by a feature selection component (e.g., feature selection component 130). In some implementations, the MLM (e.g., OCM 124) may be trained to select a plurality of reference features in the input signal.

At block 630A, method 600A may continue with the processing units applying the input signal to the MLM to classify a plurality of features within the input signal to determine whether the input signal indicates a detection of a metal object associated with the input signal. The processing units may provide the plurality of features as input to the trained MLM.

At block 640A, method 600A may continue with the processing units receiving output from the trained MLM. In some implementations, the output may indicate a detection of a metal object or not. In some implementations, the output may indicate a detection of a specific type of metal object or not. For example, the MLM can classify the identified plurality of features, for example, using a probability. Processing units performing method 600A may determine that the number of the features that have been classified as belong to a class of a metal satisfies a threshold criterion (e.g., exceeding a threshold number or percentage), and then determine that the input signal indicates a detection of a metal object (or a specific type of metal). In at least one embodiment, the MLM may be trained using method 500 (or a similar method). In at least one embodiment, the MLM is trained based on a plurality of training signals having reference features of a type common with a type of the features within the input signal. In at least one embodiment, the MLM may include a recurrent neural network with at least one hidden layer. In at least one embodiment, applying the input signal to the MLM may involve executing one or more computations associated with the MLM on one or more CPUs or GPUs. In at least one embodiment, classifying provides a binary classification, for example, including non-metal or metal. In at least one embodiment, classifying provides a multi-class classification, for example, including non-metal, copper, iron, aluminum.

At block 650A, method 600A may continue with the processing units providing and causing output of a notification of a detection of the metal object (or a specific type of metal) based on the output from the trained MLM. In at least one embodiment, the notification is provided as a binary choice, for example, including non-metal or metal. In at least one embodiment, the notification is provided as one-of-multiple choice, for example, including non-metal, copper, iron, aluminum. The notification may be provided through an I/O device associated with the processing units. The notification may be stored in a any data storage that is capable of storing digital data, such as physical memory devices including volatile memory devices (e.g., RAM), non-volatile memory devices (e.g., NVRAM), mass storage devices, such as solid-state storage (e.g., Solid State Drives (SSD)), hard drives, other persistent data storage, or a combination thereof.

FIG. 6B illustrates another flow diagram of an example method 600B of using a trained machine learning model for metal detection, according to at least one embodiment. Processing units performing method 600B may perform the blocks 610B-650B similar to the blocks 610A-650A of the method 600A, respectively. At block 640B, the processing logic may receive the output, from the trained MLM, that includes a confidence value associated with a class (a binary class including non-metal or metal; a multiple class including non-metal, copper, iron, or aluminum). In some implementations, when the confidence value is below a minimal threshold value (e.g., 10% confidence), the output represents that the input signal does not indicate a detection of that class. When the confidence value is above a target detection threshold value (e.g., 50% confidence), the output represents that the input signal indicates a detection of that class. In some implementations, the output from the block 640B may include a confidence value that can be used to determine whether a repeating detection is needed. For example, if the confidence value falls between a minimal threshold value (e.g., 10% confidence) and a target detection threshold value (e.g., 50% confidence), the detector 101 may be requested to move over the previous target area again.

At block 645B, the processing logic may determine whether a confidence value satisfies a threshold criterion. For example, the threshold criterion includes a range below a minimal threshold value (e.g., 10% confidence) and/or a range above a target detection threshold value (e.g., 50% confidence). The processing logic may determine that the confidence value satisfies a threshold criterion when the confidence value does not fall between the minimal threshold value (e.g., 10% confidence) and the target detection threshold value (e.g., 50% confidence). The processing logic may determine that the confidence value does not satisfy a threshold criterion when the confidence value does not fall between the minimal threshold value (e.g., 10% confidence) and the target detection threshold value (e.g., 50% confidence).

At block 670B, responsive to determining that the confidence value does not satisfy the threshold criterion, the processing logic may make the detector 101 move over the possible target area again to receive a second input signal and perform the blocks 610B-640B to receive a second output which may include a second confidence value. The second confidence value may be used, similarly as described above, to compare with the minimal threshold value (e.g., 10% confidence) and the target detection threshold value (e.g., 50% confidence) to determine whether the second input signal does not indicate a detection of a class, the second input signal indicates a detection of a class, or a repeating detection is needed.

In some implementations, the processing logic may receive the output with the second confidence value having non-zero value, the processing logic may use the location of the object corresponding to the previous input signal (e.g., center of the signal) as a feature and use it as a heat map measurement to extract more features (e.g., the proximity of the coil to a nearest detection area). More features generally mean better predictions. If the processing logic outputs with a confidence value above the target detection threshold value on the second or later input signal, the processing logic may report a target detection as shown in block 650B. If the confidence value is still between the minimal threshold value and the target detection threshold value, the processing logic may repeat the movement of the detector 101 over the same area and perform the blocks 610B-640B again. If the confidence value is still between the minimal threshold value and the target detection threshold value for several times of repeating, the processing logic may report a suspect area detection, and sends an alert to the user.

Figure 7:
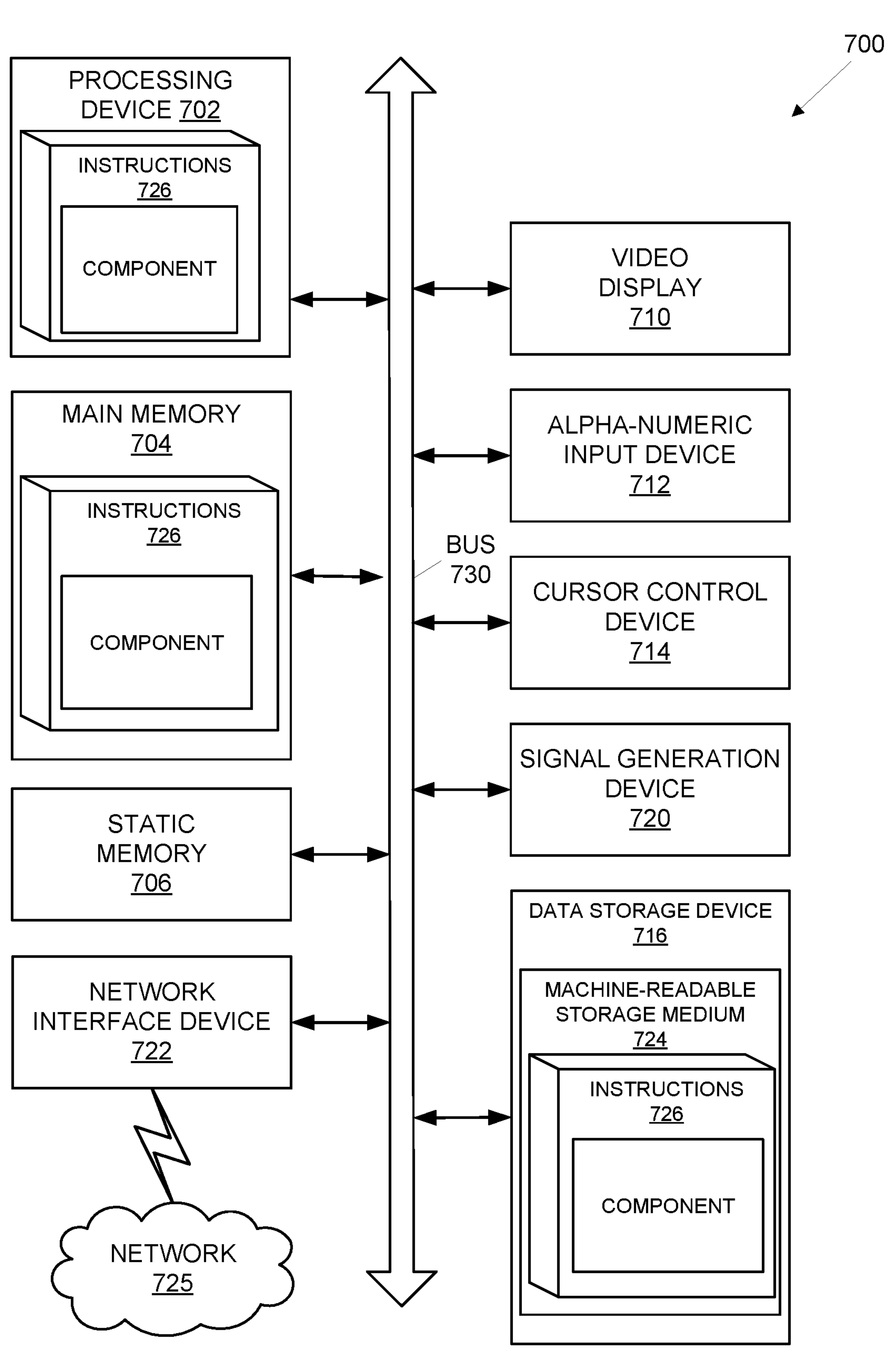
FIG. 7 is a block diagram of an example computer system in which embodiments of the present disclosure may operate.

FIG. 7 illustrates an example computer system 700 operating in accordance with some embodiments of the disclosure. In FIG. 7, a diagrammatic representation of a machine is shown in the illustrative form of the computer system 700 within which a set of instructions, for causing the machine to perform any one or more of the methodologies discussed herein, may be executed. In alternative embodiments, the machine 700 may be connected (e.g., networked) to other machines in a local area network (LAN), an intranet, an extranet, or the Internet. The machine 700 may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that machine 700. Further, while only a single machine is illustrated, the term "machine" shall also be taken to include any collection of machines that individually or jointly execute a set (or multiple sets) of instructions to perform any one or more of the methodologies discussed herein.

The example computer system 700 may comprise a processing device 702 (also referred to as a processor or CPU), a main memory 704 (e.g., read-only memory (ROM), flash memory, dynamic random access memory (DRAM) such as synchronous DRAM (SDRAM), etc.), a static memory 706 (e.g., flash memory, static random access memory (SRAM), etc.), and a secondary memory (e.g., a data storage device 716), which may communicate with each other via a bus 730.

Processing device 702 represents one or more general-purpose processing devices such as a microprocessor, central processing unit, or the like. More particularly, the processing device may be a complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. Processing device 702 is configured to execute a metal detection system for performing the operations and steps discussed herein. For example, the processing device 702 may be configured to execute instructions implementing the processes and methods described herein, for supporting the metal detection system 100 of FIG. 1, in accordance with one or more aspects of the disclosure.

Example computer system 700 may further comprise a network interface device 722 that may be communicatively coupled to a network 725. Example computer system 700 may further comprise a video display 710 (e.g., a liquid crystal display (LCD), a touch screen, or a cathode ray tube (CRT)), an alphanumeric input device 712 (e.g., a keyboard), a cursor control device 714 (e.g., a mouse), and an acoustic signal generation device 720 (e.g., a speaker).

Data storage device 716 may include a computer-readable storage medium (or more specifically a non-transitory computer-readable storage medium) 724 on which is stored one or more sets of executable instructions 726 (e.g., of the metal detection system 100 of FIG. 1). In accordance with one or more aspects of the disclosure, executable instructions 726 may comprise executable instructions encoding various functions of the metal detection system 100 of FIG. 1 in accordance with one or more aspects of the disclosure.

Executable instructions 726 may also reside, completely or at least partially, within main memory 704 and/or within processing device 702 during execution thereof by example computer system 700, main memory 704 and processing device 702 also constituting computer-readable storage media. Executable instructions 726 may further be transmitted or received over a network via network interface device 722.

While computer-readable storage medium 724 is shown as a single medium, the term "computer-readable storage medium" should be taken to include a single medium or multiple media. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "analyzing," "selecting," "receiving," "presenting," "generating," "deriving," "providing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the disclosure also relate to an apparatus for performing the methods described herein. This apparatus may be specially constructed for the required purposes, or it may be a general-purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear as set forth in the description below. In addition, the scope of the disclosure is not limited to any particular programming language. It will be appreciated that a variety of programming languages may be used to implement the teachings of the disclosure.

It is to be understood that the above description is intended to be illustrative, and not restrictive. Many other embodiment examples will be apparent to those of skill in the art upon reading and understanding the above description. Although the disclosure describes specific examples, it will be recognized that the systems and methods of the disclosure are not limited to the examples described herein, but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A system comprising:

a pulsed induction (PI) metal detector configured to output a voltage signal responsive to being proximate to an object, wherein the PI metal detector comprises a power supply, a coil, and a waveform generating component; and a processing device configured to:

receive the voltage signal outputted from the PI metal detector, wherein the voltage signal comprises a square wave including an on period and an off period;

determine, based on the voltage signal and position information associated with the PI metal detector, a plurality of features;

provide the plurality of features as input to a trained machine learning model (MLM);

receive output from the trained MLM, wherein the output comprises a confidence value associated with a class of a metal, and wherein the confidence value comprises a percentage;

determine whether the confidence value in the output satisfies a threshold criterion; and responsive to determining that the confidence value satisfies the threshold criterion, cause output of a notification indicating a detection of the class of the metal in the object, wherein determining the plurality of features further comprises:

selecting data points in the voltage signal satisfying a criterion;

identifying a first feature of the plurality of features by using a linear regression on the voltage signal;

identifying a second feature of the plurality of features by comparing predefined data points associated with the voltage signal;

identifying a third feature of the plurality of features by using a Fast Fourier transform (FFT) on the voltage signal;

using a proximity to the object of the position information as a fourth feature of the plurality of features;

using signal intensity information of the voltage signal as a fifth feature of the plurality of features; and using a heat map representing detection confidence of the voltage signal as a sixth feature of the plurality of features.

2. The system of claim 1, wherein the voltage signal comprises a voltage measured over a time period.

3. The system of claim 1, wherein the trained MLM comprises a binary classification model.

4. The system of claim 1, wherein the trained MLM comprises a multi-class classification model.

5. The system of claim 1, wherein the trained MLM comprises a recurrent neural network with at least one hidden layer.

6. The system of claim 1, wherein the trained MLM is trained using data input comprising historical features of a type common with a type of the plurality of features associated with the voltage signal.

7. The system of claim 1, wherein the processing device is further configured to:

preprocess the voltage signal to detect a second plurality of features; and select the plurality of features from the second plurality of features.

8. The system of claim 1, wherein the voltage signal is associated with a voltage measured across the coil.

9. The system of claim 1, wherein the output of the notification comprises providing an alert to a user device or making a physical marking proximate to the object.

10. A method comprising:

receiving a voltage signal outputted from a PI metal detector responsive to the PI metal detector being proximate to an object, wherein the PI metal detector comprises a power supply, a coil, and a waveform generating component, wherein the voltage signal comprises a square wave including an on period and an off period;

determining, based on the voltage signal and position information associated with the PI metal detector, a plurality of features;

providing the plurality of features as input to a trained machine learning model (MLM);

receiving output from the trained MLM, wherein the output comprises a confidence value associated with a class of a metal, and wherein the confidence value comprises a percentage;

determining whether the confidence value in the output satisfies a threshold criterion; and responsive to determining that the confidence value satisfies the threshold criterion, causing output of a notification indicating a detection of the class of the metal in the object, wherein determining the plurality of features further comprises:

selecting data points in the voltage signal satisfying a criterion;

identifying a first feature of the plurality of features by using a linear regression on the voltage signal;

identifying a second feature of the plurality of features by comparing predefined data points associated with the voltage signal;

identifying a third feature of the plurality of features by using a Fast Fourier transform (FFT) on the voltage signal;

using a proximity to the object of the position information as a fourth feature of the plurality of features;

using signal intensity information of the voltage signal as a fifth feature of the plurality of features; and using a heat map representing detection confidence of the voltage signal as a sixth feature of the plurality of features.

11. The method of claim 10, wherein the voltage signal comprises a voltage measured over a time period.

12. The method of claim 10, wherein the trained MLM comprises a recurrent neural network with at least one hidden layer.

13. A non-transitory computer-readable medium storing instructions thereon, wherein the instructions, when executed by a processing device, cause the processing device to:

receive a voltage signal outputted from a pulsed induction (PI) metal detector responsive to the PI metal detector being proximate to an object, wherein the PI metal detector comprises a power supply, a coil, and a waveform generating component, wherein the voltage signal comprises a square wave including an on period and an off period;

determine, based on the voltage signal and position information associated with the PI metal detector, a plurality of features;

provide the plurality of features as input to a trained machine learning model (MLM);

receive output from the trained MLM, wherein the output comprises a confidence value associated with a class of a metal, and wherein the confidence value comprises a percentage;

determine whether the confidence value in the output satisfies a threshold criterion; and responsive to determining that the confidence value satisfies the threshold criterion, cause output of a notification indicating a detection of the class of the metal in the object, wherein determining the plurality of features further comprises:

selecting data points in the voltage signal satisfying a criterion;

identifying a first feature of the plurality of features by using a linear regression on the voltage signal;

identifying a second feature of the plurality of features by comparing predefined data points associated with the voltage signal;

identifying a third feature of the plurality of features by using a Fast Fourier transform (FFT) on the voltage signal;

using a proximity to the object of the position information as a fourth feature of the plurality of features;

using signal intensity information of the voltage signal as a fifth feature of the plurality of features; and using a heat map representing detection confidence of the voltage signal as a sixth feature of the plurality of features.

14. The non-transitory computer-readable medium of claim 13, wherein the voltage signal comprises a voltage measured over a time period.

15. The non-transitory computer-readable medium of claim 13, wherein the trained MLM comprises a binary classification model.

16. The non-transitory computer-readable medium of claim 13, wherein the trained MLM comprises a multi-class classification model.

17. The non-transitory computer-readable medium of claim 13, wherein the trained MLM comprises a recurrent neural network with at least one hidden layer.

18. The non-transitory computer-readable medium of claim 13, wherein the trained MLM is trained using data input comprising historical features of a type common with a type of the plurality of features associated with the voltage signal.

19. The non-transitory computer-readable medium of claim 13, wherein the processing device is further configured to:

preprocess the voltage signal to detect a second plurality of features; and select the plurality of features from the second plurality of features.

20. The non-transitory computer-readable medium of claim 13, wherein the output of the notification comprises providing an alert to a user device or making a physical marking proximate to the object.

* * * * *